Jan. 16, 1923.
B. HIRSCH.
PROTECTIVE INNER LINER FOR PNEUMATIC TIRES.
FILED NOV. 4, 1919.
1,442,407.
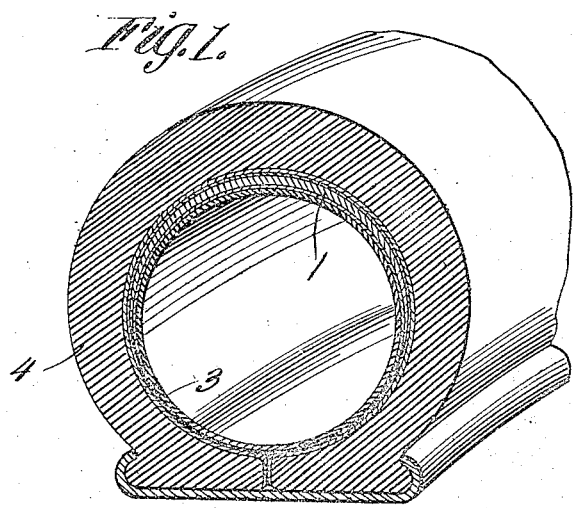
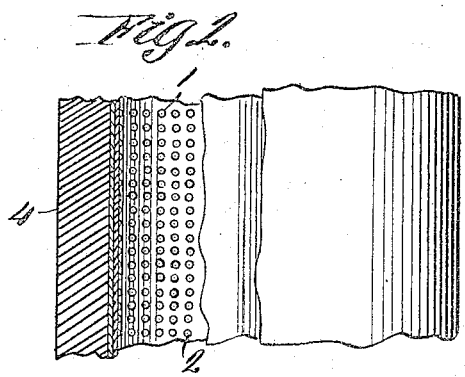
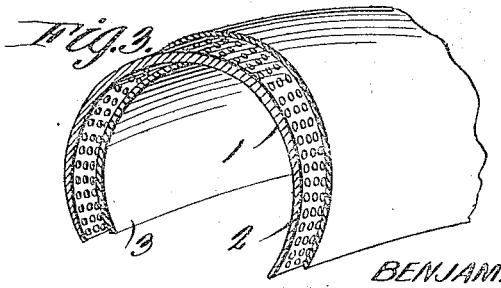
WITNESSES
Guy M. Spring
U. B. Hillyards
Inventor
BENJAMIN HIRSCH
By Richard B. Owen
Attorney Patented Jan. 16, 1923.

1,442,407

UNITED STATES PATENT OFFICE.

BENJAMIN HIRSCH, OF LEOMINSTER, MASSACHUSETTS.

PROTECTIVE INNER LINER FOR PNEUMATIC TIRES.

Application filed November 4, 1919. Serial No. 335,576.

*To all whom it may concern:*

Be it known that I, BENJAMIN HIRSCH, a citizen of the United States, residing at Leominster, in the county of Worcester and State of Massachusetts, have invented certain new and useful Improvements in Protective Inner Liners for Pneumatic Tires, of which the following is a specification.

This invention has for its object to prolong the period of usefulness of pneumatic tires and to practically prevent blowouts, punctures and flat tires.

The invention consists of a metal lining for the shoe or casing or a pneumatic tire to come between the shoe and inner tube, thereby mutually protecting each and increasing the life of the tire so that it may practically be worn to the last layer before being discarded, the protector being removed and used again with another tire which may be unserviceable for ordinary use without the application thereto of the invention.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the drawings:—

Figure 1 is a sectional perspective view of a pneumatic tire illustrating the application of the invention, Figure 2 is a detail view of a portion of the tire with the layers broken away to illustrate more clearly the protective lining, and Figure 3 is a detail perspective view of a portion of the lining illustrating the layers adjacent thereto and upon opposite sides thereof.

Corresponding and like parts are referred to in the following description and indicates in the several views of the drawing by like reference characters.

The foraminous lining 1 which constitutes the essence of the invention consists of a metal strip bent into circular form and transversely curved, said strip being relatively thick intermediate of its edges and gradually decreasing in thickness from the medial line to its opposite edges. The lining may be split or continuous, that is, the lining is provided with innumerable minute openings or foramina 2 which tend to decrease the weight and add to the flexibility of the protector. While it is contemplated to construct the device of any metal yet it is preferred to utilize brass or analogous composition, the same possessing a degree of resiliency so as to yield and not detract from the cushioning effect of the tire.

The protective lining or inner rim will be provided in different sizes corresponding with the different sizes and makes of pneumatic tires so that when required, a protective inner rim of proper size may be obtained to snugly fit within the shoe or casing whose life and period of service is to be prolonged. The inner rim or lining when in position is disposed between the inner tube 3 and the inner wall of the shoe or casing 4. In cross section, the lining or inner rim extends about two-thirds or approximately three fourths of a circle. The outer thickened portion is disposed adjacent the inner side of the tread portion of the shoe or casing and the edge portion extends a short distance along the side of the shoe or casing. This is indicated most clearly in Fig. 1. Fig. 3 illustrates the lining or inner rim having layers adjacent the inner and the outer sides thereof and these layers may if desired constitute a protective covering or may consist of the inner tube and the inner layer of the shoe or casing.

The invention provides a lining or protective inner rim which may be applied to pneumatic tires which have become worn and unserviceable for ordinary use. A tire of this character when fitted with a lining or protective inner rim is rendered practically proof against blowout and puncture since the metal lining distributes and sustains the inner pressure and prevents an object from penetrating the inner tube. The flexibility of the protector does not detract from the cushioning effect of the tire. Weak places in a worn tire are reinforced and the tire may be worn nearly through to the lining or protective inner rim before being discarded and the rim may be removed and used repeatedly as will be readily understood.

Having thus fully described my invention what I claim as new and desire to secure by Letters Patent, is:—

A removable protecting device for tire casings comprising an annular metallic resilient body curved transversely and provided with a plurality of minute perforations disposed in close relation to one another for reducing the weight of the body and for adding to the resilient qualities thereof, the body gradually decreasing in thickness from its circumferential center toward its circumferential edges, defining flexible wings for engaging the side walls of a tire casing, the thickest portion of the body being disposed at the tread portion of the casing.

In testimony whereof I affix my signature in presence of two witnesses.

BENJAMIN HIRSCH.

Witnesses:
  RALPH W. FOSTER,
  A. C. LESLIE.